S. S. FITCH.
Ice Cream-Freezer.
No. 136,496. Patented March 4, 1873.
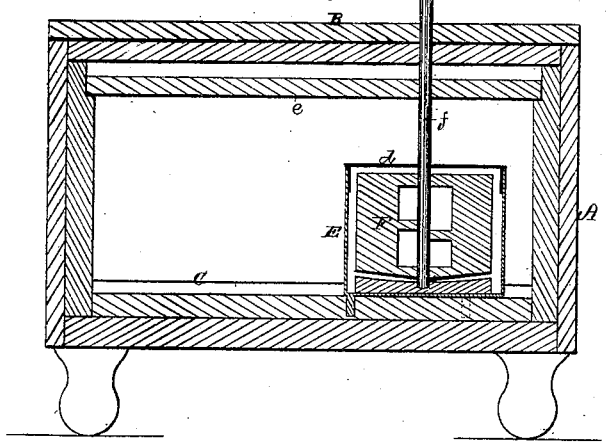
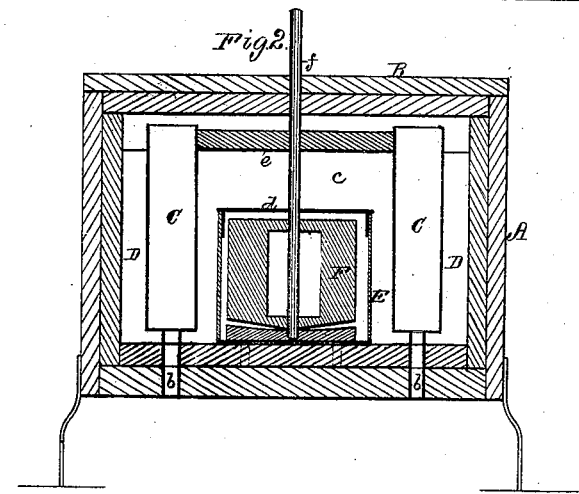
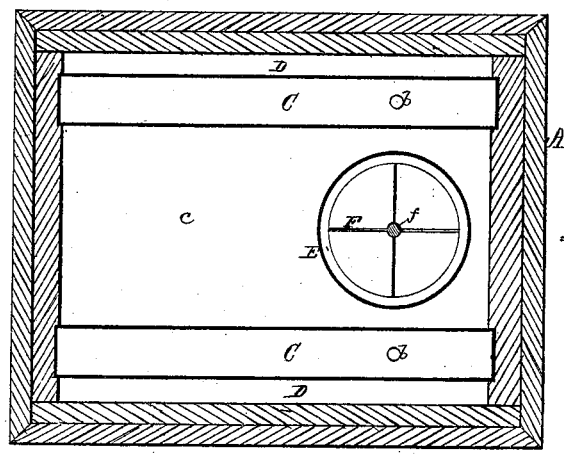
Witnesses.
S. W. Piper
L. N. Möller
Samuel S. Fitch.
by his attorney
R. H. Eddy

UNITED STATES PATENT OFFICE.

SAMUEL S. FITCH, OF NEW YORK, N. Y.

IMPROVEMENT IN ICE-CREAM FREEZERS.

Specification forming part of Letters Patent No. 136,496, dated March 4, 1873.

*To all whom it may concern:*

Be it known that I, SAMUEL S. FITCH, of the city, county, and State of New York, have invented a new and useful Improvement in Ice-Cream Refrigerators or Freezers; and I do hereby declare the same to be fully described in the following specification and represented in the accompanying drawing, of which—

Figure 1 is a longitudinal and vertical section, Fig. 2 a transverse and vertical section, and Fig. 3 a horizontal section, of a refrigerator provided with my invention.

In such drawing, A represents a wooden box or case, open at top, and there provided with a lid or cover, B. Within the said case, and extending across it from end to end of it, but not quite down to the bottom, are two narrow open vessels, C C, of metal, which are arranged near to the opposite sides of the said case, there being a narrow space, D, between each vessel C and the next adjacent side of the case A. Each vessel C may be provided with an exit or drain pipe, $b$, extended from its bottom through that of the box A. Within the space or chamber $c$, between the two vessels C C, I place one or more cylindrical cans or vessels, E, each having within it a rotary agitator, F, and being provided with a cover, $d$. The space $c$ I furnish with an auxiliary wooden cover, $e$, and I extend the shaft $f$ of the agitator upward through the said cover $e$, and also up through the cover B, all being as represented.

When the apparatus is in use the vessels C C are to be filled or supplied with a mixture of salt and snow or ice, or some other suitable refrigerating substitute; and the cream to be iced is to be within the vessel or vessels E. The air within the box A, being reduced to a refrigerating temperature, will absorb heat from the vessel or vessels E, and, the agitator of each being put in revolution, the cream will be frozen as may be required.

The auxiliary cover is to enable the main cover to be raised and the vessels C C to be supplied with ice and salt without causing any material introduction of warm air into the space $c$. By having an air-space between each of the vessels C and the next adjacent side of the box a circulation of the air in the box A will be produced around the entire vessel, whereby the air will be expeditiously cooled and kept so.

The advantage of my refrigerating apparatus over common ice-cream freezers is that the vessel for holding the cream is kept out of contact with the refrigerating mixture; and when one can of cream may have been frozen it may be at once removed from the box and another or fresh can be put in its place, and this without loss of the refrigerating material.

I claim as my invention—

The box A, the refrigerating-vessels C C, the auxiliary cover $d$, the cream-holder E, and its agitator F, combined and arranged as set forth.

SAMUEL S. FITCH.

Witnesses:
  R. H. EDDY,
  J. R. SNOW.